(12) United States Patent
Allen et al.

(10) Patent No.: US 8,618,440 B2
(45) Date of Patent: Dec. 31, 2013

(54) SPRAYED WELD STRIP FOR IMPROVED WELDABILITY

(75) Inventors: David B. Allen, Oviedo, FL (US); Allister W. James, Orlando, FL (US); David W. Hunt, Orlando, FL (US)

(73) Assignee: Siemens Energy, Inc., Orlando, FL (US)

( * ) Notice: Subject to any disclaimer, the term of this patent is extended or adjusted under 35 U.S.C. 154(b) by 1876 days.

(21) Appl. No.: 11/649,574

(22) Filed: Jan. 4, 2007

(65) Prior Publication Data
US 2008/0166585 A1   Jul. 10, 2008

(51) Int. Cl.
*B23K 10/02* (2006.01)

(52) U.S. Cl.
USPC ............... 219/137 WM; 148/524; 228/119

(58) Field of Classification Search
None
See application file for complete search history.

(56) References Cited

U.S. PATENT DOCUMENTS

| | | |
|---|---|---|
| 4,213,026 A | 7/1980 | Duvall et al. |
| 4,231,795 A | 11/1980 | Gibson et al. |
| 4,336,312 A | 6/1982 | Clark et al. |
| 4,804,815 A | 2/1989 | Everett |
| 4,938,805 A | 7/1990 | Haydon et al. |
| 4,965,095 A | 10/1990 | Baldi |
| 4,973,366 A | 11/1990 | Yasuda et al. |
| 5,040,718 A | 8/1991 | Lee et al. |
| 5,106,010 A | 4/1992 | Stueber et al. |
| 5,142,778 A | 9/1992 | Smolinski et al. |
| 5,302,414 A | 4/1994 | Alkhimov et al. |
| 5,374,319 A | 12/1994 | Stueber et al. |
| 5,509,980 A | 4/1996 | Lim |
| 5,554,837 A | 9/1996 | Goodwater et al. |
| 5,732,467 A | 3/1998 | White et al. |
| 5,785,775 A | 7/1998 | Smashey et al. |
| 5,897,801 A | 4/1999 | Smashey et al. |
| 6,049,978 A | 4/2000 | Arnold |
| 6,054,672 A | 4/2000 | Foster et al. |
| 6,084,196 A | 7/2000 | Flowers et al. |
| 6,191,379 B1 | 2/2001 | Offer et al. |
| 6,302,649 B1 | 10/2001 | Mukira et al. |
| 6,333,484 B1 | 12/2001 | Foster et al. |
| 6,354,799 B1 | 3/2002 | Mukira et al. |
| 6,364,971 B1 | 4/2002 | Peterson, Jr. et al. |
| 6,376,801 B1 | 4/2002 | Farrell et al. |
| 6,468,367 B1 | 10/2002 | Mukira et al. |
| 6,489,584 B1 * | 12/2002 | Kelly .................... 219/121.46 |
| 6,491,207 B1 | 12/2002 | Smashey et al. |

(Continued)

OTHER PUBLICATIONS

D. Coutsouradis et al. Materials for Advanced Power Engineering, 1994, p. 1059, Table I.*

(Continued)

*Primary Examiner* — Brian Jennison

(57) ABSTRACT

A method for welding to a superalloy material without causing cracking of the material. The method includes the steps of depositing a weld strip (18) of a weldable material onto a superalloy substrate material (12) using a spray deposition process (20) and then forming a weldment (26) to the weld strip. None or a controlled amount of the substrate material (12) is melted during the weld in order to maintain the concentration of strengthening elements in the local melt within a zone of weldability. The spray deposition process may be a thermal process such as HVOF or a cold spray process. A groove (16) may be formed in a surface (10) of the superalloy substrate material to receive the weld strip. A diffusion heat treatment step may be used to improve adhesion between the weld strip and the superalloy material.

16 Claims, 2 Drawing Sheets

(56) References Cited

U.S. PATENT DOCUMENTS

| | | |
|---|---|---|
| 6,495,793 B2 | 12/2002 | Tewari |
| 6,565,680 B1 | 5/2003 | Jackson et al. |
| 6,596,411 B2 * | 7/2003 | Feng et al. .................. 428/637 |
| 6,659,332 B2 | 12/2003 | Smashey et al. |
| 6,673,169 B1 * | 1/2004 | Peterson et al. ............. 148/524 |
| 6,696,176 B2 | 2/2004 | Allen et al. |
| 6,872,912 B1 | 3/2005 | Wos et al. |
| 6,902,617 B2 | 6/2005 | Betz |
| 6,908,288 B2 | 6/2005 | Jackson et al. |
| 6,916,387 B2 | 7/2005 | Lulofs |
| 6,926,754 B2 | 8/2005 | Shamblen et al. |
| 6,972,390 B2 | 12/2005 | Hu et al. |
| 6,996,906 B2 | 2/2006 | Bowden, Jr. et al. |
| 7,051,435 B1 | 5/2006 | Subramanian et al. |
| 2005/0098243 A1 | 5/2005 | Budinger et al. |
| 2005/0220995 A1 * | 10/2005 | Hu et al. ...................... 427/180 |
| 2005/0274701 A1 | 12/2005 | Rabinovich et al. |

OTHER PUBLICATIONS

"CM-247 LC: for turbine blades and vanes"; [online]; [retrieved on Oct. 19, 2006]; 3 pages; Retrieved from http://www.c-mgroup.com/spec_sheets/CM_247.htm.

"Nickel Base DS: A selection guide to common vacuum melted alloys"; [online]; [retrieved on Oct. 19, 2006; 2 pages; Retrieved from http://www.cm-group.com/vacuum_melt_index/nickel_base.ds.htm.

"Superalloy"; [online]; [retrieved on Aug. 28, 2006]; 3 pages; Retrieved from http://en.wikipedia.org/wiki/Superalloy.

Edited by Chester T. Sims, et al.; "Effects of Minor Elements"; The Superalloys: Vital High Temperature Gas Turbine Materials for Aerospace and Industrial Power; pp. 526-527.

* cited by examiner

SPRAYED WELD STRIP FOR IMPROVED WELDABILITY

FIELD OF THE INVENTION

This invention relates generally to the field of materials technology; and more specifically to the field of materials joining; and in particular to the field of welding of superalloy materials.

BACKGROUND OF THE INVENTION

Nickel-based and cobalt-based superalloy materials are commonly used to provide high mechanical strength for very high temperature applications, such as for the blades or other components of a gas turbine engine. The term "superalloy" is used herein as it is generally understood in the art to refer to alloys that can be used at high temperatures, often in excess of 0.7 of the absolute melting temperature of the material. Creep and oxidation resistance are primary design criteria for such materials. Examples of superalloys are those sold under the trademarks/commercial designations Hastelloy, Inconel, IN939, Haynes-188, MP98T, TMS-63, TMS-71, TMS-75, and CM-247 LC, and those described in U.S. Pat. Nos. 7,011,721; 7,004,992; 6,974,508; 6,936,116; and 6,494,971; among many others.

Superalloy components are very expensive, and thus the repair of a damaged part is preferred over its replacement. However, known weld repair techniques for superalloy materials have met with only limited success, due primarily to the propensity of superalloy materials to develop cracks resulting from low melting temperature grain boundary constituents and the volume changes that occur during cooling due to the precipitation of a gamma prime phase. Some high strength superalloys containing large percentages of gamma prime phase, such as the material sold under the commercial designations Mar-M 247 and CM247LC, are considered almost impossible to weld due to their propensity to form microcracks in the region under the weld bead and in the heat affected zone (HAZ). In addition to such hot cracking of the weld filler metal and heat affected zone, these materials exhibit strain age cracking, which results in cracks extending into the base metal of the component. Strengthening elements used in superalloys include: elements which segregate primarily to the gamma phase for solid solution strengthening (W, Mo, Re, Cr, Co, Fe); elements which segregate primarily to the gamma prime phase (Al, Ti, Nb, Ta, V); and grain boundary strengtheners (C, B, Zr, Hf, Y). FIG. 6 illustrates the known relationship between weldability and the weight percentage of the specific strengthening elements aluminum and titanium. Superalloys are generally readily weldable when the sum of the concentration of aluminum plus one half of the concentration of titanium is less than 3% by weight (w/o). This region of FIG. 6 may be referred to herein as the zone of weldability. If that sum is greater than 3 w/o, the superalloy is generally difficult to weld.

Several techniques have been proposed to improve the weldability of superalloy materials. U.S. Pat. No. 4,336,312 describes a combination of a controlled chemical modification of a cast nickel-based superalloy material along with a pre-weld thermal conditioning cycle. Other known techniques utilize a very high density power source (laser or e-beam) to form a very small weldment in order to limit the amount of melted material. One such technique is disclosed in U.S. Pat. No. 6,364,971 which describes a laser welding technique following a pre-conditioning hot isostatic process. U.S. Pat. No. 6,333,484 describes a welding technique wherein the entire weld area is preheated to a maximum ductility temperature range, and this elevated temperature is maintained during the welding and solidification of the weld. U.S. Pat. No. 7,051,435 describes the use of a braze preform for forming a lower temperature brazed joint with a superalloy material. Each of these patents is incorporated by reference herein. Further improvements in the welding of superalloy materials and other difficult-to-weld alloys are desired.

BRIEF DESCRIPTION OF THE DRAWINGS

The invention is explained in the following description in view of the drawings that show.

DETAILED DESCRIPTION OF THE INVENTION

The present inventors circumvent the prior art problems associated with the welding of superalloy materials by applying a weld strip of more-easily welded material to the superalloy material, and then forming a fusion weld along the weld strip, thereby eliminating the need for fusion welding directly to the superalloy base material. The resulting joint avoids the use of a lower temperature braze material and thereby maintains the high temperature capability of the base metal while eliminating crack formation in the superalloy base material during and after welding. The weld strip may be applied to the superalloy base metal by coating the base material with a thermal process, such as a high velocity oxy-fuel process (HVOF) or high velocity air-fuel process (HVAF), or with a cold spray process, or with any other spray process effective to provide an adequately strong mechanical joint between the weld strip material and the superalloy base material without adversely affecting the properties of the base material. A groove may be formed in the superalloy base metal for receiving the sprayed weld strip material, and the as-sprayed weld strip surface may be prepared, such as by machining, to be flat with the surrounding base material surface, prior to the subsequent application of a fusion weld.

Figure 1:
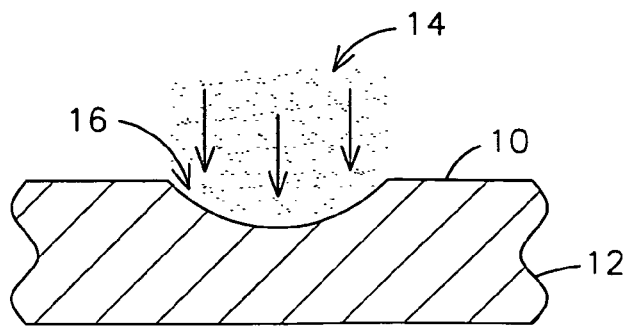
FIG. 1 is a partial cross-sectional view of a component formed of a superalloy substrate material having a groove formed in a surface thereof and undergoing a grit blasting process.
Figure 2:
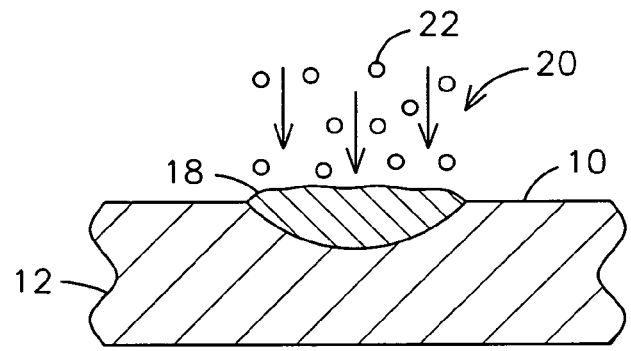
FIG. 2 is a partial cross-sectional view of the component of FIG. 1 undergoing a spray process for depositing a weld strip into the groove.
Figure 3:
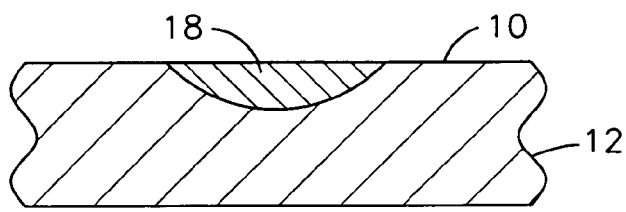
FIG. 3 is a partial cross-sectional view of the component of FIG. 2 wherein the weld strip has been machined to be flush with the surface of the substrate material.
Figure 4:
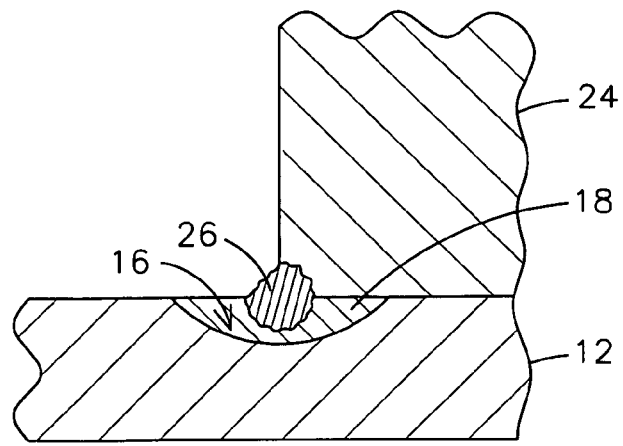
FIG. 4 is a partial cross-sectional view of the component of FIG. 3 having been fusion welded to a second member without any melting of the superalloy material underlying the weld strip.

One embodiment of the present invention is illustrated in FIGS. 1-4, where a surface 10 of a superalloy substrate material 12 is prepared for welding. The surface 10 may be subjected to a grit blasting 14 or other appropriate process to produce a desired degree of roughness as may be appropriate for the later material deposition step. A surface roughness average of about 140 μ-in. (3-4 micron) Ra may be used for example. A groove 16 may first be formed in the surface 10, such as by machining, to define a region of the surface 10 for receiving a weld strip. A weld strip 18 is then applied to the surface 10 by a spray process 20, as illustrated in FIG. 2. The material selected for the weld strip 18 is an alloy with known good weldability. The spray process 20 and its parameters are selected to ensure a strong mechanical bond between the sprayed material 22 and the underlying substrate material 12. For example, less than 10% grit contamination may be desired to ensure good contact between the sprayed and substrate materials. In one embodiment, a high velocity oxy-fuel spray process is used, with the spray parameters being controlled to limit the substrate temperature to remain less than 300° C. A cold spray process such as described in U.S. Pat. No. 5,302,414 may be used in another embodiment. A tensile strength of the bond between the sprayed and substrate material of at least 10 ksi (68 MPa) may be desired for some embodiments. The as-sprayed weld strip 18 may be machined or ground to be flush with surface 10, as shown in FIG. 3 or otherwise shaped as desired in preparation for a subsequent fusion welding step. FIG. 4 illustrates one such fusion welding step where a second member 24 is joined to substrate 12 with a fusion weld 26. Note that the groove 16 and/or sprayed weld strip 18 may be selected to have a thickness adequate to ensure that the subsequent fusion weldment 26 does not penetrate the full thickness of the weld strip to melt or otherwise to adversely affect the underlying substrate material 12. A thickness of weld strip 18 of about 1,000 microns or in the range of 500-2,000 microns may be useful to prevent any melting of the underlying substrate material in certain embodiments.

Figure 5:
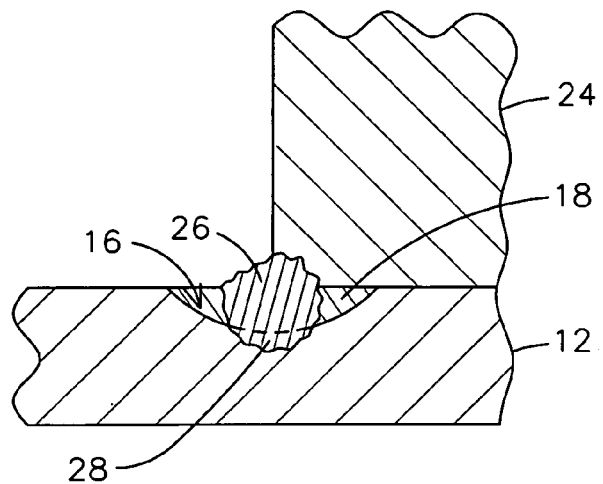
FIG. 5 is a partial cross-sectional view of the component of FIG. 3 having been fusion welded to a second member with a limited amount of melting of the superalloy material underlying the weld strip.

In other embodiments, the thickness of the weld strip 18 may be selected to allow for a controlled amount of local superalloy substrate metal dilution to occur for mixing with the melted weld strip material in a dilution region 28 during the fusion weld, as illustrated in FIG. 5. Advantageously, the amount of the substrate material mixed with the melted weld strip material is limited so that the melted weld strip material is able to adequately dilute the melted gamma prime rich substrate material. Preferably the amount of melted substrate superalloy material is limited to a degree such that the local melt conditions remain within the zone of weldability (i.e. a concentration within the melted material mix that is less than 3 w/o for the sum of the aluminum concentration plus one-half the titanium concentration). This will minimize or eliminate the prior art problems of hot cracking and strain age cracking of the gamma prime rich superalloy substrate materials.

Figure 6:
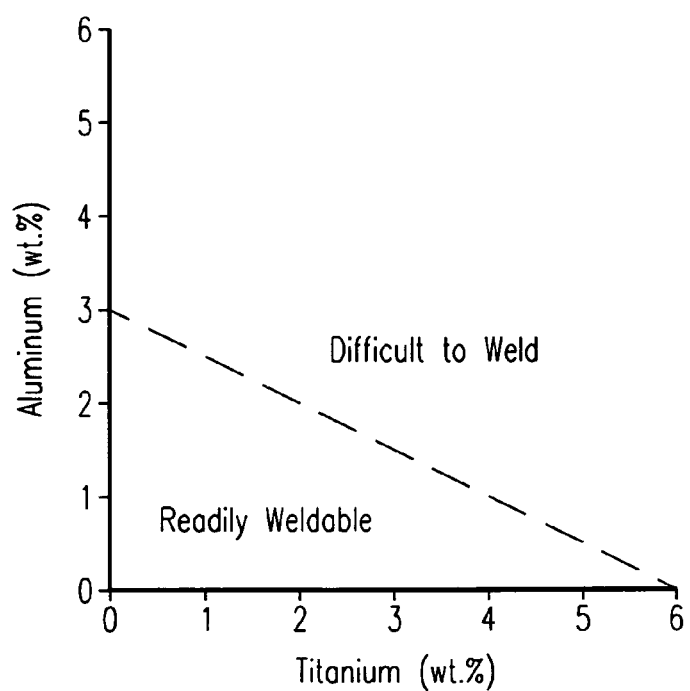
FIG. 6 illustrates the known relationship between the weldability of a superalloy and its concentration of the strengthening elements titanium and aluminum.

There are many alloys that are known to be easy to weld and that provide other mechanical properties that would be adequate for use as a weld strip material for various applications. Examples of such materials include nickel-based alloys (such as those sold under the commercial designations IN617 and IN625) and cobalt-based alloys (such as those sold under the commercial designations X-45 and ECY-768). Any of these or other alloys having compositions within the zone of weldability of FIG. 6 may be selected as the weld strip material for various applications of the present invention. The material selected for the weld strip 18 may include less of the strengthening elements of aluminum and/or titanium than is present in the underlying superalloy material.

A weld strip 18 may be sprayed onto one or both surfaces to be joined. In certain applications, the weld strip 18 may be machined or ground into a weld preparation geometry in lieu of the flat surface of FIG. 3. A diffusion heat treatment at a sub-solvus temperature may be applied before welding to enhance the adhesion strength between the weld strip 18 and the underlying substrate material 12. In one embodiment a diffusion heat treatment of about 1975° F. (1080° C.) may be applied for 2-4 hours. The fusion welding step may be performed with any known welding process, such as gas tungsten arc (GTA) welding.

In one test application, IN625 powder was applied by a HVOF thermal spray process to form the weld strip 18 on a substrate 12 of Alloy CM247LC material. The inventors found the use of argon as the carrier gas for the HVOF process to be undesirable due to entrapment of the argon within the deposited layer of material resulting in blistering of the material upon subsequent fusion welding. Nitrogen may be desired as the carrier gas for the HVOF material deposition step.

The present invention will be useful for many applications such as for gas turbine components. For example, the present invention will facilitate the welding of Alloy CM247LC vane airfoils to Alloy CM247LC vane shrouds by depositing an IN625 alloy weld strip to the respective surfaces of both the airfoil and the shroud prior to them being joined by GTA welding, thus permitting the fabrication of modular vanes. The present invention will also facilitate the welding of IN625 alloy impingement or metering plates to the shell air side of gas turbine Alloy CM247LC or IN939 alloy ring segments or vanes/blades.

The present invention provides improved superalloy weldability without requiring any change or special processing for the base material, thus permitting the use of higher strength superalloys than in prior art applications where welding to the base material is required. The present invention also facilitates the repair of superalloy components, such as gas turbine vanes made of IN939 material, because it eliminates the source of cracking after weld repair.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A method for joining to a nickel-based superalloy substrate material having a composition outside of a zone of weldability defined as a concentration of strengthening elements wherein a sum of a concentration of aluminum plus one-half a concentration of titanium in the material is less than 3 w/o, the method comprising:
   applying to the superalloy substrate material a weld strip of a material having a composition within the zone of weldability using a spray deposition process; and
   forming a fusion weld to the weld strip.

2. The method of claim 1, wherein none of the superalloy substrate material melts during the step of forming a fusion weld.

3. The method of claim 1, further comprising melting a portion of the superalloy substrate material during the step of forming a fusion weld while maintaining local melt conditions within the zone of weldability.

4. The method of claim 1, further comprising performing a diffusion heat treatment to enhance adhesion between the weld strip and the superalloy substrate material prior to the step of forming the fusion weld.

5. The method of claim 1, further comprising applying the weld strip using a thermal spray process.

6. The method of claim 5, further comprising applying the weld strip using a high velocity oxy-fuel spray process.

7. The method of claim 1, further comprising applying the weld strip using a cold spray process.

8. The method of claim 1, further comprising:
depositing the weld strip to a thickness in the range of 500-2,000 microns; and
forming the fusion weld with a gas tungsten arc welding process.

9. The method of claim 1, further comprising:
creating a groove in the superalloy substrate material; and
directing the spray deposition process to apply the weld strip into the groove.

10. The method of claim 9, further comprising machining the as-deposited weld strip to be flat with a surface of the superalloy material prior to the step of forming the fusion weld.

11. An apparatus comprising:
a substrate comprising a superalloy substrate material having a composition outside of a zone of weldability defined as a concentration of strengthening elements wherein a sum of a concentration of aluminum plus one-half a concentration of titanium in the material is less than 3 w/o;
a weld strip of a material having a composition within the zone of weldability spray deposited onto the superalloy substrate material; and
a fusion weldment formed onto the weld strip.

12. The apparatus of claim 11, wherein the weldment includes none of the superalloy substrate material.

13. The apparatus of claim 11, wherein the weldment includes some of the superalloy substrate material, and a composition of the weldment remains within the zone of weldability.

14. The apparatus of claim 11, further comprising a groove formed in the superalloy substrate material and the weld strip deposited within the groove.

15. The apparatus of claim 11, wherein the superalloy substrate material comprises a gas turbine vane shroud formed of one of Alloy CM247LC and IN939 material, the weld strip comprises IN625 alloy material, and the fusion weldment joins an IN625 impingement plate to the weld strip.

16. The apparatus of claim 11, wherein the weld strip comprises a thickness in the range of 500-2,000 microns.

* * * * *